Feb. 2, 1932.  W. A. HEALY  1,843,128
CLOSURE FOR APERTURED RECEPTACLES
Filed April 25, 1929

INVENTOR.
William A. Healy
BY
Stuart C. Barnes
ATTORNEY.

Patented Feb. 2, 1932

1,843,128

UNITED STATES PATENT OFFICE

WILLIAM A. HEALY, OF DETROIT, MICHIGAN, ASSIGNOR TO STANDARD TUBE AND MANUFACTURING COMPANY, OF DETROIT, MICHIGAN, A CORPORATION OF MICHIGAN

CLOSURE FOR APERTURED RECEPTACLES

Application filed April 25, 1929. Serial No. 357,929.

This invention relates to a closure for apertured receptacles and more particularly to a closure for a filler tube.

It is customary in the assembly of a filler tube closure to fit a rubber or cork gasket between the mouth of the filler tube and the cap in order to effect a liquid proof seal between the cap and the filler tube. In the type of filler tube closure wherein the cap is turned onto the filler tube, the rubber or cork gasket, owing to its high co-efficient of friction, hinders the turning on and off of the cap by its frictional engagement with the filler tube mouth and the cap. This frictional engagement between the gasket and the filler tube mouth also causes the filler tube mouth to chew away and destroy the gasket.

It is the object of this invention to obviate these undesirable features of this type of gasket. This is achieved by placing a spring-thrust washer and dish-shaped disc between the gasket and the cap, which washer has a relatively small area of contact with the disc. The gasket frictionally engages the tube and disc and owing to the relatively low co-efficient of friction of the disc, the washer rotates freely thereupon and hence the cap is easily turned on or off the filler tube. This permits the cap to be turned while the gasket remains stationary upon the filler tube mouth and therefore is not worn or chewed away.

Figure 1:
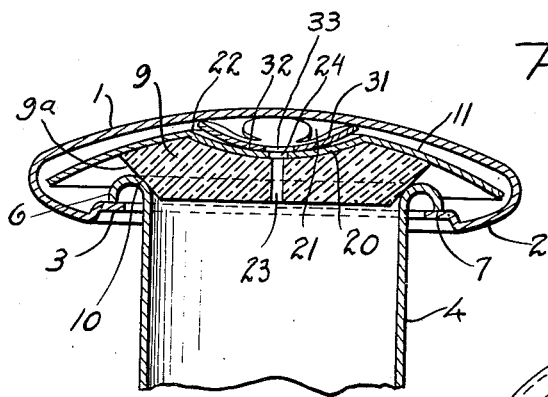
Fig. 1 is a section showing the closure attached to the filler tube.

Referring more particularly to the drawings, the closure consists briefly of the cap 1 which has an annular inturned flange portion 2 from which are struck the locking fingers 3. The filler tube 4 has the depending flange portions 6 and the diametrically opposed slots 5 which are positioned intermediate the two depending flange portions. These depending flange portions have the cam surfaces 7 which terminate in the shallow notches 7a and the shoulders 8 which serve as abutments for the locking fingers 3 when the cap is turned on the filler tube.

As shown in Fig. 1, in order to effect a liquid-tight seal between the cap 1 and the filler tube 4, a gasket 9 of any suitable material such as rubber or cork is interposed between the cap 1 and the mouth 10 of the filler tube. The gasket has the flared outer surface 9a which effects a wedging engagement with the mouth of the filler tube. If the gasket 9 is free to engage the cap 1, it is obvious that in turning the cap onto the filler tube 4 that the gasket 9 will frictionally engage the cap and the mouth 10 of the filler tube, and hence, will not only retard the turning movement of the cap, but will also be chewed and worn away. In order to obviate this frictional retardation and wear, there is placed within the cap and between the gasket 9 and the cap, the disc 11 which is made of steel or any suitable metal having a relatively low co-efficient of friction. The gasket is secured to the disc by any suitable means such as glue or rivets.

The disc 11 is shaped substantially like an inverted dish with a central cup-shaped portion 20. The cup-shaped portion 20 cooperates with the cap 1 to form the chamber 21. Positioned in the chamber 21 between the disc 11 and cap 1 is the spring-thrust washer 31 which resiliently engages the cap and the disc. Owing to the bowl-like configuration of the spring-thrust washer, the contact area between the disc 20 and the washer is relatively small. This permits the washer to rotatively engage the disc with a minimum of friction and thereby facilitates the turning on or off of the cap.

For some uses it is desirable to provide the closure with air vents, hence, the gasket 9 and disc 11 may be provided with suitable air vents 23 and 24 respectively. The opening 33 in the spring-thrust washer coincides with the vents 23 and 24. When the cap is turned completely onto the filler tube, the joint or line of contact between the disc 11 and cap 1 is such as to permit passage of air from the atmosphere into the chamber 21. Owing to the chamber 21 into which vent 23 opens any liquid which perchance would be forced through the vent 21 would tend to spread when it reached the chamber 21, strike the cap 1 and be deflected back to the cup portion 20, and thence run back again into the receptacle through vent 23. This arrangement of vents allows the proper passage of air with substantially no leakage of liquid.

Figure 3:
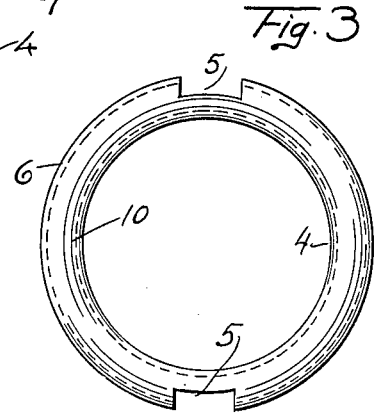
Fig. 3 is a top plan view of the filler neck.
Figure 2:
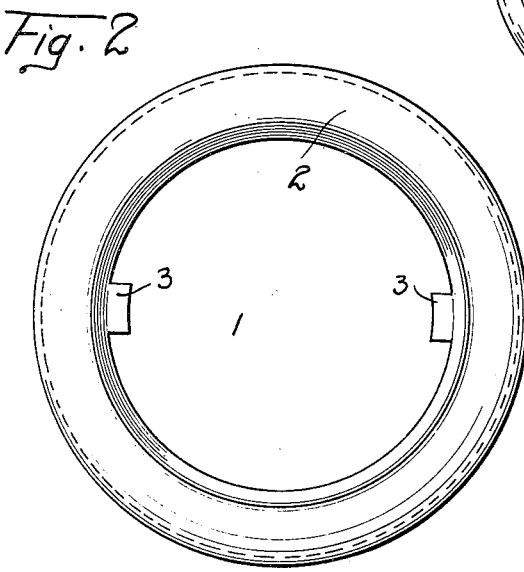
Fig. 2 is a bottom plan view of the cap.
Figure 5:
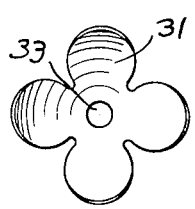
Fig. 5 is an elevation of the spring-thrust washer.
Figure 4:
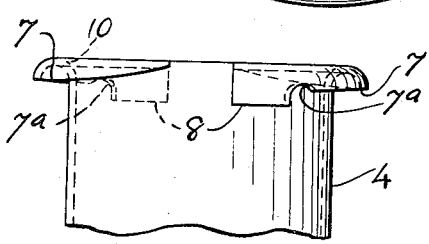
Fig. 4 is an elevation of the filler neck showing the depending cam surfaces.

To attach the cap to the filler tube, the locking fingers 3 are placed in the slots 5 and the cap is then turned from left to right as the filler tube is viewed in Fig. 3. The locking fingers 3 slidably engage the cam surfaces 7 and finally slide into the notches 7a. The spring-thrust washer 31 engages the disc 11 as at 32 and rotates freely thereupon owing to the small friction area of contact. It is obvious that during the turning on or off of the cap that the gasket 9 frictionally engages the filler tube mouth 10. Hence, the gasket remains stationary upon the mouth of the filler tube and in turn holds the disc stationary while the washer 31, which turns with the cap 1, turns easily about the disc.

It is evident from the above description that there is here produced a closure for a filler tube that is easily turned on and off without chewing the sealing gasket and which at the same time efficiently seals the mouth of the filler tube.

What I claim is:

1. A closure for apertured receptacles having in combination, a cap arranged to be turned onto said receptacle by a locking finger and cam connection, sealing means spaced from the cap for the aperture of the receptacle, a disc of material having a relatively low co-efficient of friction in non-rotative relation with the said sealing means, and a spring-thrust washer positioned between the disc and the cap having a relatively small area of contact with the said disc whereby the cap can be easily turned onto said receptacle while the sealing means remain stationary relative to said receptacle.

2. A closure for apertured receptacles having in combination, a cap arranged to be turned onto the said receptacle, rubber means covering said aperture in the receptacle for effecting a seal between the cap and the receptacle, and a metal disc secured to the sealing means having a cup-shaped portion arranged to co-operate with the cap to form a chamber, the said rubber sealing means having a small vent for permitting communication between the said chamber and the inside of said receptacle.

3. A closure for apertured receptacles having in combination, an imperforate cap arranged to be turned onto the said receptacle, resilient means closing the opening in the receptacle for effecting a seal between the cap and the receptacle, a dish-shaped metal disc having a cup-shaped portion arranged to co-operate with the said cap to form a chamber, said sealing means being fixed to said metal disc and having an air vent coinciding with an air vent in the said cup-shaped portion of the metal disc whereby any liquid passing through the air vent in the said sealing means will strike the imperforate cap and be deflected back onto the cup-shaped portion of the metal disc and then flow back into the receptacle through the vent in the said sealing means.

In testimony whereof I affix my signature.

WILLIAM A. HEALY.